United States Patent
Cuff et al.

[15] 3,660,779
[45] May 2, 1972

[54] ATHERMALIZATION OF LASER RODS

[72] Inventors: David W. Cuff, Chepachet, R.I.; Paul G. De Baryshe, Lincoln, Mass.

[73] Assignee: American Optical Corporation, Southbridge, Mass.

[22] Filed: Jan. 2, 1970

[21] Appl. No.: 236

[52] U.S. Cl. ..........................................334/94.5
[51] Int. Cl. ..........................................H01s 3/00
[58] Field of Search ..................................331/94.5

[56] References Cited

UNITED STATES PATENTS 3,484,714  12/1969  Koester et al. ..........................331/94.5
3,283,262  11/1966  Marcatili ..................................331/94.5

*Primary Examiner*—William L. Sikes
*Assistant Examiner*—Conrad Clark
*Attorney*—William C. Nealon, Noble S. Williams and Robert J. Bird

[57] ABSTRACT

A cone of 90° vertex or a Brewster angle cone is disposed co-axially with a cylinder and laser rod, the cylinder having an internal reflective surface, for discriminating against radially polarized components of the laser light. An alternative embodiment discriminates against tangentially polarized light by disposing a Brewster angle cone co-axially with the rod and uses another cone as the retroreflective element for the laser system. In any of the embodiments, a 90° Faraday rotator may be used to change the polarization of the mode conserved.

8 Claims, 7 Drawing Figures

PATENTED MAY 2 1972　　3,660,779

INVENTOR.
DAVID W. CUFF
PAUL G. DeBARYSHE

BY William C. Walter
ATTORNEY

PATENTED MAY 2 1972 3,660,779

INVENTORS
DAVID W. CUFF
PAUL G. De BARYSHE

BY William C. Nealon

ATTORNEY

ATHERMALIZATION OF LASER RODS

FIELD OF THE INVENTION

This invention relates generally to lasers and more particularly to laser arrangements for providing athermalization of the laser rods used therein.

PRIOR ART

It is now well-known that amplification of electro-magnetic wave energy can be achieved by stimulated emission from media in which there is provided, at least intermittently, a population inversion in a characteristic energy system for the laser material. Such media are generally referred to as negative temperature or laser material and the amplification process is termed laser action.

One method of improving the efficiency of the interaction between the wave to be amplified and the negative temperature material involves resonating the wave in a cavity which contains the medium. At the optical frequencies of interest, however, the wavelengths involved are too small to permit cavity dimensions to be on the order of one wavelength, which is the typical relationship at the lower microwave frequencies (masers). Therefore, cavities having dimensions which are many times larger than the wavelength of the energy involved are employed.

Among the successfully employed optical maser or laser cavity structures are plane parallel reflective surfaces separated by a convenient gap, which gap includes the lasering material. The reflectors are positioned with respect to each other and with respect to the negative temperature medium in a manner to produce multiple light wave reflections therebetween, the reflected waves traveling through the amplifying medium on each passage between the reflectors. During each such passage interaction with atomic resonators in the laser medium produces amplification. The usefulness of the laser depends upon keeping the associated losses lower in magnitude than the magnitude of the available energy gain. Stated another way, it is important that the Q of the cavity be kept as high as possible.

In presently used systems, lasers have generally been stimulated to emit optical radiation as multi-mode electro-magnetic wave energy. Since the energy is multi-mode, various optical relationships which are helpful in reducing beam losses could not be satisfied for the total wave power. Consequently, the efficiency of an operational laser is not as high as it might otherwise be.

Also, a non-uniform temperature distribution in a laser rod may set up refractive index variances which limit the useful output of the rod. However, under certain condition, the index of refraction of certain laser materials is practically independent of temperature for one particular polarization of the laser light. By suppressing the unwanted polarization, one may achieve an effectively athermalized laser medium. Attempts at athermalization have thus far produced unacceptable optical and mechanical properties in the systems in which they have been tried.

SUMMARY OF THE INVENTION

Accordingly, a primary object of the present invention is to produce a high Q laser arrangement.

A further object is to produce a laser arrangement in which there is provided an athermalized laser rod and optical system.

A still further object is to provide a laser configuration in which one or more modes are suppressed, thereby providing athermalization for the rod and system.

These and other objects are provided in one illustrated embodiment of the invention wherein a 90° vertex angle cone is provided in the resonant cavity for a laser rod. The cone is disposed co-axially with a cylindrical reflector acting as the retroreflective element of the cavity. The conical mirror absorbs any beams refracted therein from the laser rod. By this means radial polarization is substantially eliminated in the system. An alternate configuration provides a Brewster angle cone disposed co-axially with a retroreflective element which is also a cone. By this alternative means tangential polarized components are substantially eliminated. A 90° rotator may be also used in any of the systems to provide either tangentially polarized or radially polarized light.

Other objects, advantages and embodiments of the invention will become apparent by reference to the immediately following detailed description of a preferred and alternative embodiments and their construction with reference to the accompanying drawings, in which:

DETAILED DESCRIPTION OF A PREFERRED AND ALTERNATIVE EMBODIMENTS

Figure 1:
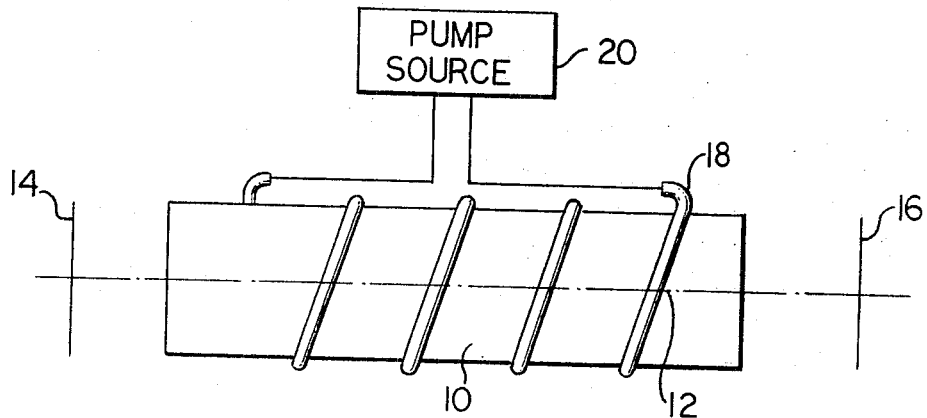
FIG. 1 is a schematic representation of a laser rod and resonant cavity according to the prior art.

A commonly used laser structure such as that described by Townes and Schawlow in "Physical Review" volume 112, page 1,940 (1958), is described with reference to FIG. 1. The structure includes a rod 10 of suitable lasering material disposed in a high-Q resonant cavity of the Fabry-Perot interferometer type with a reflector 14 on one end and a partially silvered mirror 16 (1 to 96 percent transmission) at the other end. When the lasering material (having axis 12) is illuminated by a helical flash tube 18 or the like, an excess of population of upper level atoms of the lasering material is produced (commonly called negative temperature condition). This process of optical pumping with flash tube 18 is triggered by pump source electronics 20. Atoms in the upper energy level begin to fall spontaneously to lower levels in a process called fluorescence. By collision with other atoms during propagation back and forth in the resonant cavity, the fluorescence stimulates additional upper to lower level transitions, usually referred to as induced emission. Superposition of the induced emission on the spontaneous emission takes place and the laser output in the form of highly coherent, monochromatic and intense light is emitted at the partially silvered mirror 16.

Figure 2:
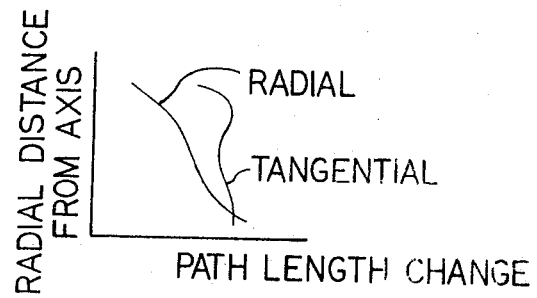
FIG. 2 is a graphical representation of examples of path length changes for radial and tangential modes at various points in a typical rod.

In a laser system such as that shown in FIG. 1, a typical representation of path length changes for both radial and tangential polarization modes of rays propagating therethrough is shown in FIG. 2. These optical path length changes occur in such a laser system when operated at a high repetition rate such that a quasi-steady-state heat flow condition is attained. It may be seen that the radial mode has a much greater path length change near the center of the rod than near the periphery. However, the tangential mode has path length changes which are much more evenly distributed for rays near the axis, near the periphery or therebetween. Accordingly, the distortion or focusing caused by temperature for radial modes in many cases should preferably be eliminated. In other cases, the radial mode might be preferred to the tangential in order to intentionally obtain the lensing or focusing effect just described or if (due to different material compositions) the lensing effect is more prevalent in the tangential modes.

Figure 3:
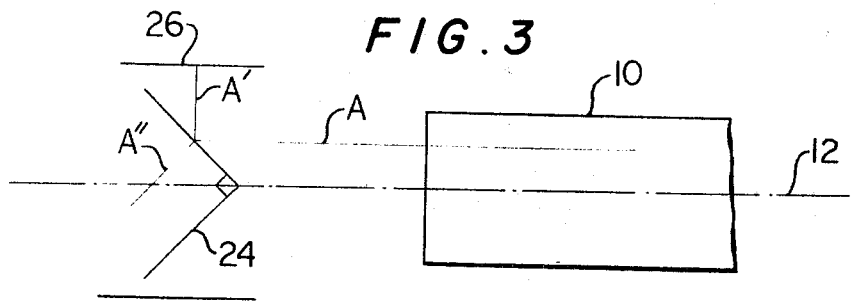
FIG. 3 is a schematic representation of a laser rod and cylindrical retroreflective element provided with a 90° cone to produce the athermalization according to the present invention.
Figure 6:
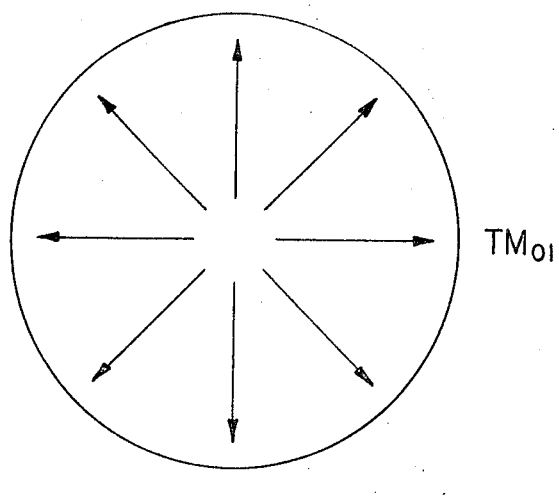
FIG. 6 is a representation of the lowest order radially polarized mode $TM_{01}$.
Figure 7:
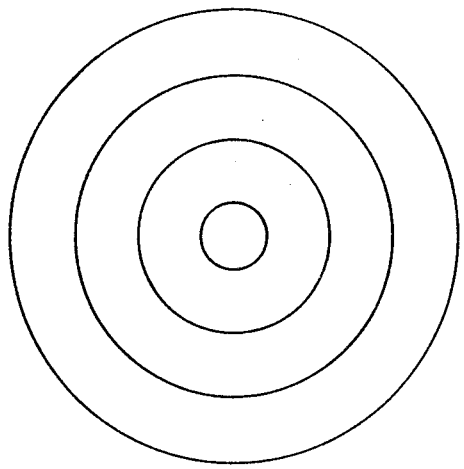
FIG. 7 is a representation of the lowest order tangentially polarized mode $TE_{01}$.

Therefore, according to the present invention, a system such as that shown in FIG. 3 should obtain tangentially polarized rays and substantially eliminate the radial modes. An example of such modes is shown in FIGS. 6 and 7, wherein the lowest order modes $TM_{01}$ and $TE_{01}$ are shown. The system of FIG. 3, as previously mentioned, is used to eliminate the mode represented by FIG. 6 and conserve the mode represented by FIG. 7. Ray A is propagated by and through the negative temperature medium 10 (the laser rod) and then to right-angle cone 24 (the cone has a 90° vertex). At the conical surface the ray A will be substantially divided into components of radially and tangentially polarized light, with the tangentially polarized component A' reflecting to a cylindrical mirror 26, which is coaxial with the cone and the rod. Such components will be again reflected to the conical surface and propagated through the rod 10. On the other hand, the radially polarized component A'' will be substantially absorbed by the cone 24 and therefore effectively eliminated from the system to thereby avoid the focusing problem described with reference to FIG. 2. An alternative embodiment to that shown in FIG. 3 will provide a tapered cylinder 26 and a Brewster angle cone rather than the 90° vertex cone shown in FIG. 3.

Figure 4:
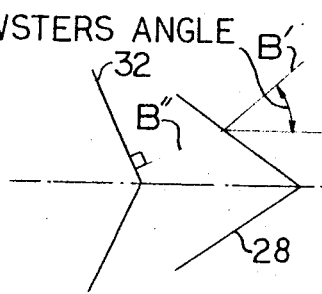
FIG. 4 is a schematic representation of an alternative embodiment of the present invention wherein a Brewster angled cone is disposed between a retroreflective conical element of the resonant cavity and the laser rod.
Figure 4:
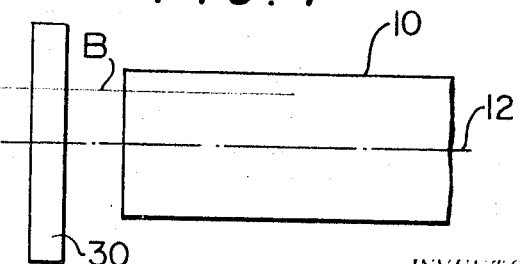

A further alternative embodiment would provide a Brewster angle cone 28 and 90° Faraday rotator 30 in order to provide the mode discrimination desired. A ray B emanating from the rod 10 would have its components rotated 90° by the element 30 and then be propagated to the Brewster angle cone 28. At that cone 28 the tangentially polarized mode B' would be reflected from the cone and thereby eliminated from the system. On the other hand, the radially polarized component B'' would be propagated through the cone to another cone 32 whose vertex angle is adjusted to provide normal incidence of the radial component B'' propagated through the Brewster angle cone. The cone 32 acts as a retroreflective element and reflects the radial component B'' back through the Brewster angle cone to the Faraday rotator 30. The element 30 would rotate the radial component by 90° and therefore propagate to the laser rod 10 only tangentially polarized rays. The system of FIG. 4 is therefore an illustration of mode discrimination to eliminate the radially polarized components and propagate substantially the tangentially polarized components. An alternative to the scheme of FIG. 4 would be to avoid tangential modes and propagate radial modes by eliminating the use of the Faraday rotator 30.

Figure 5:
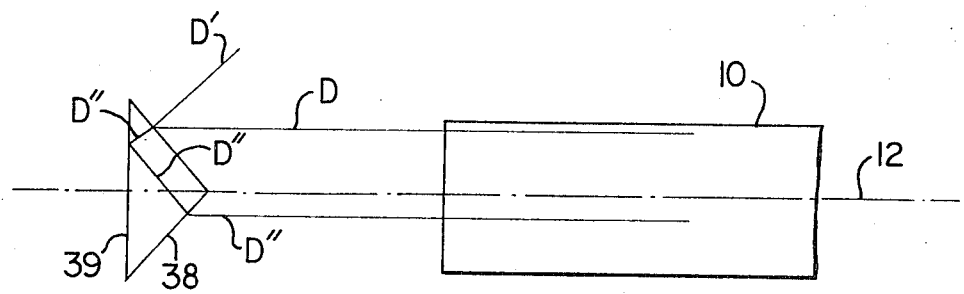
FIG. 5 is a schematic representation of a modification of the configuration of FIG. 4 wherein an isosceles reflective cone is aligned along the laser rod axis and has its rear surface coated.

Providing a pure homogenizing device by disposing an isosceles reflective cone 38 in a laser system may be described by reference to FIG. 5 wherein such a component 38 is shown as having a reflective back surface 39 to define an end of the resonant cavity. Rays D propagated by the rod 10 are incident to the cone 38 (presuming a Brewster angle of incidence) and tangentially polarized components D' are reflected from the conical surface and eliminated from the system. The radially polarized components D'' are reflected from the back surface 39 and then to the opposite side of the cone 38. In this embodiment it may be seen that all rays incident to the cone on one side of the axis are propagated through the cone to the other side of the axis to provide a homogenizing effect to further aid in elimination of the lensing or focusing effect described previously herein. The homogenizing effect alone can be provided without mode discrimination by use of a vertex angle for the cone 38 which is other than the Brewster angle. Furthermore, the reflective back surface 39 may be replaced by polarizing layers in such a non-Brewster angle configuration to provide an alternative means for such discrimination if it is desired.

What is claimed is:

1. A laser system using a laser rod as the active element thereof for producing beams of light comprising: an absorbtive cone co-axial with said rod, and a hollow cylinder being co-axial with said cone and rod and having a reflective inside surface, said cone reflecting tangentially polarized components of said light incident to it and directing them to the inside surface of said cylinder and absorbing radially polarized components of light incident to it, and the inside surface of said cylinder providing a retroreflective element for said system and reflecting said tangentially polarized components back to said cone for reflection toward said rod.

2. The invention according to claim 1 wherein a 90° Faraday rotator is disposed between said cone and said rod for rotating said tangentially polarized components and propagating them as radially polarized components to said rod from said cone.

3. The invention according to claim 2 wherein said cone is a 90° vertex cone.

4. A laser system using a laser rod as the active element thereof for producing beams of light comprising: a Brewster angle cone co-axial with said rod, and another cone co-axial with said Brewster angle cone and said rod, said Brewster angle cone reflecting tangentially polarized components of said light incident to it and refracting radially polarized components of said light incident to it to said other cone, said other cone having a vertex angle such as to provide normal incidence for said radially polarized components incident to said other cone, said other cone providing a retroreflective element for said system and reflecting said radially polarized components back through said Brewster angle cone to said rod.

5. The invention according to claim 4 wherein a 90° Faraday rotator is disposed between said Brewster angle cone and said rod for rotating said radially polarized components and propagating them as tangentially polarized components to said rod from said other cone.

6. A laser system using a laser rod as the active element thereof for producing beams of light comprising: a homogenizing cone disposed co-axially with said rod and having a reflective base providing a retroreflective element for said system for receiving light from said rod on its conical surface on one side of its axis thereby reflecting a first polarized component of said light out of said system and refracting a second polarized component of said light to said back surface, from where said second polarized component of said light is reflected to the conical surface on the other side of the axis of said cone for propagation from said cone to said rod.

7. The invention according to claim 6 wherein said cone is a Brewster angle cone and light incident thereon from said rod has its tangentially polarized components reflected and its radially polarized components refracted to said back surface.

8. The invention according to claim 7 wherein a 90° Faraday rotator is disposed between said cone and said rod for rotating said radially polarized components and propagating them as tangentially polarized components to said rod from said cone.

* * * * *